United States Patent
Hjelmvik

(10) Patent No.: US 7,014,109 B2
(45) Date of Patent: Mar. 21, 2006

(54) METHOD RELATING TO A VEHICLE PARKING CASH-PAYMENT SYSTEM

(75) Inventor: Torbernt Hjelmvik, Järfälla (SE)

(73) Assignee: Modul-System Sweden AB, Järfälla (SE)

(*) Notice: Subject to any disclaimer, the term of this patent is extended or adjusted under 35 U.S.C. 154(b) by 0 days.

(21) Appl. No.: 10/240,076

(22) PCT Filed: Mar. 29, 2001

(86) PCT No.: PCT/SE01/00689

§ 371 (c)(1),
(2), (4) Date: Sep. 26, 2002

(87) PCT Pub. No.: WO01/73701

PCT Pub. Date: Oct. 4, 2001

(65) Prior Publication Data

US 2003/0141363 A1  Jul. 31, 2003

(30) Foreign Application Priority Data

Mar. 29, 2000 (SE) .................................. 0001115

(51) Int. Cl.
*G06K 5/00* (2006.01)

(52) U.S. Cl. ........................................ 235/382; 705/13
(58) Field of Classification Search ................ 235/384, 235/380, 462.01, 375–378, 382, 33; 705/13
See application file for complete search history.

(56) References Cited

U.S. PATENT DOCUMENTS

| | | | |
|---|---|---|---|
| 5,905,247 A | 5/1999 | Ilén .............................. | 235/384 |
| 5,940,481 A * | 8/1999 | Zeitman ...................... | 705/13 |
| 6,415,156 B1 * | 7/2002 | Stadelmann ................ | 455/466 |
| 6,519,329 B1 * | 2/2003 | Hjelmvik ............... | 379/106.01 |
| 6,240,365 B1 * | 5/2001 | Bunn ......................... | 701/213 |

FOREIGN PATENT DOCUMENTS

| | | |
|---|---|---|
| DE | 198 28 951 A1 | 1/2000 |
| FR | 2725816 A3 * | 4/1996 |
| WO | WO 96/34366 | 10/1996 |
| WO | WO 98/04080 | 1/1998 |
| WO | WO 98/30982 | 7/1998 |
| WO | WO 99/09525 | 2/1999 |
| WO | WO 99/48062 | 9/1999 |
| WO | WO 9948062 A1 * | 9/1999 |

* cited by examiner

*Primary Examiner*—Diane I. Lee
(74) *Attorney, Agent, or Firm*—Alfred J. Mangels

(57) ABSTRACT

A method of making cash payments in a vehicle parking system in which a mobile telephone (1) is used to commence and terminate parking of a vehicle, and where a telephone user sends at least one code to a receiving computer (2) belonging to the parking system via said mobile telephone upon commencement and termination of a parking period. The invention is characterised in that there is used a start packet which includes a user specific code (7), a one-time code, such as a PIN code, a telephone number to said computer (2), and a statement as to the amount of money available for parking purposes; in that when connecting to the parking system, the mobile telephone (1) is caused to be connected to said computer (2) via said telephone number, whereafter the user specific code (7) and the one-time code are caused to be sent to said computer by means of the mobile telephone; in that said computer (2) is caused to detect and store the number of the mobile telephone (1); in that said computer is caused to compare the user specific code and the one-time code; in that when agreement is found between the user specific code and the one-time code, the user specific code is stored together with the number of the mobile telephone and the amount of money available for parking purposes; and in that commencement and termination of a parking period are respectively initiated by causing the mobile telephone (1) to be connected to a predetermined telephone number belonging to said computer (2).

10 Claims, 1 Drawing Sheet

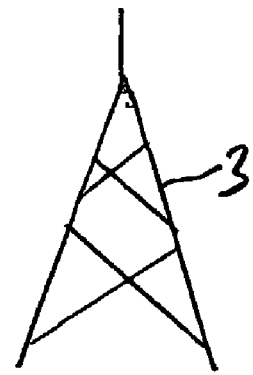
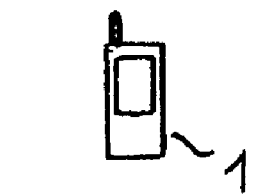
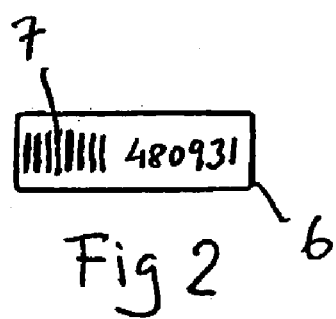
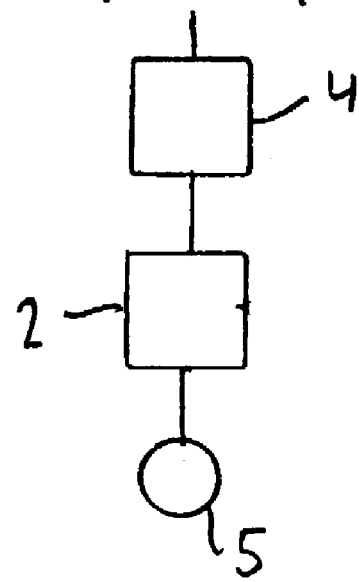

METHOD RELATING TO A VEHICLE PARKING CASH-PAYMENT SYSTEM

BACKGROUND OF THE INVENTION

1. Field of the Invention

The present invention relates to a method that pertains to a vehicle parking cash-payment system in which a mobile telephone can be used to commence and to terminate parking of a vehicle and in which a telephone user sends at least one code to a receiving computer via a mobile telephone system when commencing and terminating a parking period.

2. Description of the Related Art

Swedish Patent Specification No. 9800888-1 teaches a system for parking vehicles with the aid of a mobile telephone. According to this patent specification, data carried on a cash card or some like card in the possession of the telephone user and accepted by the parking system as a means of payment, and at least one user-specific reference, are stored and tied together in a database belonging to the parking company concerned.

Preferably, the user-specific reference will include part of the number of the telephone used in connection with parking of the vehicle. The telephone number is caused to be detected by the parking system computer when the telephone is connected to a telephone number belonging to the parking system.

According to one embodiment, the user-specific reference includes a vehicle-specific reference in the form of a plastic card or corresponding data carrier, wherein the reference is comprised of a machine readable code on the card. A vehicle-specific reference may, of course, alternatively be the vehicle registration number.

According to this embodiment, the cash card tied to the telephone number in the database is validated for billing purposes by detecting the telephone number in question when connecting the telephone to the parking system.

The vehicle parking system may be such as to require a car park attendant either to read-off the vehicle registration number or, alternatively, said machine readable code, when checking whether or not commencement of a parking period has been announced.

In accordance with said patent, the car park attendants are equipped with a portable communications unit which is in wireless connection with a computer belonging to the company that owns the car park concerned and containing information relating to vehicles that have commenced a parking period but have not yet terminated parking. The communications unit may, for instance, be designed in accordance with the control unit described in Swedish Patent Specification 9700054-1. In this case the car park attendant enters the identity of the parking zone concerned into the control unit, which then fetches from the computer a so-called parked car list that lists the vehicles properly parked in the parking zone in question, i.e., a list of the registration numbers of vehicles that have announced commencement of a parking period. The control unit then compares the read registration numbers with the parked car list and gives an indication when commenced parking has not been announced.

Commencement and termination of a parking period can thus be announced very smoothly and effectively by a telephone.

However, a problem arises in the case of people that do not have access to a cash card that can be used for vehicle parking billing purposes. These people cannot utilize the above-described system.

The present invention solves this problem.

SUMMARY OF THE INVENTION

The present invention thus relates to a method of cash payment in vehicle parking systems in which a mobile telephone is used to commence and to terminate parking of a vehicle, and in which the telephone user sends at least one code to a receiving computer belonging to the parking system via the mobile telephone when commencing and terminating a parking period. The method involves using a start packet that includes a user-specific code and a one-time code, such as a PIN code, a telephone number to said computer, and notice of the amount of money available for parking purposes. When connecting to the parking system the mobile telephone is connected to said computer via said telephone number. The user-specific code and the one-time code are then sent to said computer via the mobile telephone and the computer is caused to detect and store the number of the mobile telephone. The computer is caused to compare the user-specific code and the one-time code, and when agreement is found between the user-specific code and the one-time code, the user-specific code is stored, together with the number of the mobile telephone and a given sum of money for use in paying parking fees. Commencement and termination of a parking period are respectively initiated by causing the mobile telephone to be connected to a predetermined telephone number belonging to said computer.

BRIEF DESCRIPTION OF THE DRAWINGS

The invention will now be described in more detail partly with reference to exemplifying embodiments thereof shown on the accompanying drawing, in which FIG. 1 is a schematic illustration of a telephone system and a vehicle parking system; and FIG. 2 illustrates a carrier provided with a user-specific code.

DESCRIPTION OF THE PREFERRED EMBODIMENTS

The present invention relates to a method of cash payment in vehicle parking systems in which a mobile telephone is used to commence and to terminate a parking period.

When commencing and terminating parking of a vehicle, a user sends at least one code to a receiving computer 2 belonging to the parking system, via the mobile telephone 1. The code may consist of or include the number of the calling telephone.

A telephone system of a known type is illustrated in FIG. 1 and includes a base station 3 and an exchange or switching center 4 belonging to the network operator concerned. The computer 2 is connected to the exchange 4 via a fixed telephone network in a known fashion.

The computer 2 is connected to a database 5 in which is stored information required for commencing and terminating parking respectively by means of a mobile telephone.

According to the invention, there is used a start packet which includes a user-specific code, a one-time code, such as a PIN code, a telephone number to the computer 2, and notice of a sum of money available for covering parking fees. Such a start packet is purchased by the user from a retail establishment that sells such start packets. This establishment may be a bookstore, a newsagent, a shop, or a special sales booth.

When a person has purchased a start packet and wishes to connect with the parking system, using his mobile telephone he calls the telephone number of the parking system computer 2 given in the start packet. This number to the computer telephone is a number particularly intended for use when connecting to the system.

When connection with the computer 2 has been established, the computer may ask the user, through the medium of a voice message, to provide the user-specific code and the one-time code. This is done by entering the codes on the telephone keypad. The codes are then sent to the computer.

The computer is therewith caused to detect and store the number of the mobile telephone. The computer is then caused to compare the user-specific code and the one-time code. In the production of the various parts of the start packet, all user-specific codes have been paired together with an associated one-time code, this information being found stored in the database 5. When agreement is found between the user-specific code and the one-time code, the computer 2 is caused to store the user-specific code together with the number of the mobile telephone and said sum of money for which parking may take place.

With regard to the sum of money, the start packet may cost, for example, SEK 500 to buy, of which SEK 450 is available for parking purposes.

According to a first embodiment, the user-specific code is a machine-readable code and is provided in the start packet on a carrier 6, said carrier 6 being intended to be placed in the vehicle in a way which will enable the machine readable code 7 to be read from outside the vehicle when carrying out a parking control check.

Commencement and termination of a parking period are respectively initiated by causing the mobile telephone to be connected to a predetermined telephone number belonging to said computer. This number may be a number that applies to a given parking zone. When parking his vehicle, the user places the carrier with the machine-readable user-specific code positioned so that a car park attendant is able to read the code.

To this end, the carrier is intended to be placed in the vehicle in a manner that will allow the machine-readable code to be read from outside the vehicle when carrying out a parking check. For instance, when the carrier 6 has the form of an adhesive strip, the strip may be stuck to the inner surface of the vehicle windscreen with the code facing outwards. The code 7 may be a bar code that can be read mechanically by the car park attendant and compared with a parked card list stored in the computer 2. The code may also be given explicitly, as shown in FIG. 2.

According to a second, alternative embodiment, the vehicle registration number is sent to said computer via the mobile telephone, when connecting to the parking system. In this case, the computer stores the vehicle registration number coupled to the user-specific code. The registration number may be sent by means of a so-called SMS message, or in some other way. For instance, the registration number may be transmitted with the use of codes where 0=00, 1=01, 2=02 . . . 9=09 and where A=10, B=11, C=12, . . . etc.

When carrying out a parking control check, the registration numbers of parked vehicles are compared with a so-called parked car list, by reading-off the registration numbers of parked vehicles with the aid of a suitable known control unit, and comparing the registration numbers coupled to a user-specific code in the computer.

When commencing a parking period, the computer 2 is caused to detect the number of a calling mobile telephone and to indicate in the computer the associated user-specific code as belonging to a vehicle for which a parking fee amount has been prepaid.

When terminating a parking period, the computer is caused to detect the number of a calling mobile telephone and therewith indicate in the computer the associated user-specific code as belonging to a vehicle for which a parking fee has not yet been paid.

When parking of a vehicle has been terminated, the computer is caused to subtract the relevant parking fee from the sum of money available for parking purposes, from an account tied to the telephone number or to the user-specific code.

Preferably, a telephone voice message informing the user of how much money is available for parking purposes or the length of parking time covered by available funds in the parking zone concerned will be generated by the computer at the commencement of a parking period.

According to a preferred embodiment, there can be obtained a refill packet that includes at least one one-time code, such as a PIN code, and a given sum of money. This refill packet can be purchased in the same way as the start packet.

When the refill packet is to be used, the mobile telephone is connected to the computer and the one-time code is sent to the computer via the mobile telephone. In this case, the mobile telephone number concerned is the number that has already been connected to the system on the basis of the start packet. The computer is then caused to detect the number of the mobile telephone and to store said number and the sum of money available together with the user-specific code that belongs to the telephone number of the mobile telephone concerned.

If no funds are available in the account, the telephone user can be so informed through the medium of a telephone voice message when connecting the mobile telephone to the computer 2.

The present invention thus solves the problem mentioned in the introduction.

Although the invention has been described above with reference to several exemplifying embodiments thereof, it will be obvious that the system can be varied with respect to the number of codes required to obtain access to the system, among other things. The code carrier can also be designed for the code to be read magnetically or in some other machine-readable manner.

The present invention shall not therefore be considered restricted to the above described exemplifying embodiments thereof, as variations and modifications can be made within the scope of the following claims.

The invention claimed is:

1. A method of making cash payments for parking in a vehicle parking system, in which a mobile telephone is used by a parking system user to commence and to terminate a parking period of a vehicle and where a parking system user sends via a mobile telephone at least one code to a receiving computer belonging to the parking system upon commencement and upon termination of a parking period, said method comprising the steps of:

purchasing by a parking system user of a start packet for use by the parking system user, which start packet includes a user-specific code, a one-time code paired with the user-specific code, a given telephone number to access the parking system computer, and identifies a specific prepaid amount of money available for parking purposes, wherein the start packet is purchased and prepaid by the parking system user at the time of purchase of the start packet;

commencing a parking period by the parking system user connecting by use of a mobile telephone to the parking system computer via the given telephone number included in the purchased start packet;

transmitting from the parking system user to the parking system computer via the mobile telephone the user-specific code and the associated one-time code included in the purchased start packet;

detecting and storing the number of the mobile telephone in the parking system computer;

comparing in the parking system computer the user-specific code and the paired one-time code transmitted by the parking system user with paired user-specific and one-time codes previously stored in the parking system computer, and, when agreement is found between the user-transmitted user-specific code and paired one-time code with the paired user-specific and one-time codes previously stored in the parking system computer storing the transmitted user-specific code together with the number of the mobile telephone and the prepaid amount of money associated with the user-specific and one-time codes included in the start packet and available for parking purposes and without withdrawing any amount from the prepaid amount for parking payment purposes until termination of the parking period;

terminating the parking period using the mobile telephone to connect to the given parking system telephone number;

accessing an account stored in the parking system computer and associated with at least one of the mobile telephone number and the parking system user's user-specific code; and subtracting a relevant parking fee from said prepaid amount stored in the parking system computer upon termination of a parking period, wherein the parking system user is not subsequently separately billed for the cost of a parking period.

2. A method according to claim 1, including the steps of detecting the telephone number of a calling mobile telephone at the commencement of a parking period, and storing in the computer the associated user-specific code as belonging to a vehicle for which an amount for a parking fee has been prepaid; and detecting the number of the calling mobile telephone upon termination of a parking period; verifying in the computer the user-specific code corresponding with the calling mobile telephone as belonging to a vehicle for which a parking fee has not yet been paid.

3. A method according to claim 1, wherein the user-specific code is a machine-readable code provided on a code carrier in the start packet, and including the step of placing the code carrier in the vehicle in a way which will allow the machine-readable code to be read from outside the vehicle during a parking control check.

4. A method according to claim 1, including the steps of: transmitting a registration number associated with the vehicle to the computer via the mobile telephone when connecting to the parking system; storing the registration number in association with the user-specific code; and comparing the registration numbers of parked vehicles with a parked car list of vehicles that have commenced a parking period to carry out a parking control check.

5. A method according to claim 1, including the steps of: purchasing a refill packet for use by the parking system user and which contains at least one new one-time code and an indicated additional prepaid sum of money; connecting the mobile telephone to the computer and transmitting the new one-time code to the computer using the mobile telephone; detecting the number of the mobile telephone and storing the mobile telephone number and the additional sum of money together with the user-specific code belonging to the number of the mobile telephone.

6. A method according to claim 5, wherein the one-time code is a PIN code.

7. A method according to claim 1, wherein the one-time code is a PIN code.

8. A method according to claim 1, wherein the user-specific code and the associated one-time code are transmitted to the parking system computer by entering the codes on the mobile telephone keypad during a telephone connection between the mobile telephone and the computer.

9. A method according to claim 1, wherein the user-specific code and the associated one-time code are transmitted to the parking system computer by voice message during a telephone connection between the mobile telephone and the computer.

10. A method according to claim 1, including the step of notifying the parking system user by a telephone voice message when connected to the parking system if the prepaid amount of money has been expended.

* * * * *